(12) United States Patent
Kawai

(10) Patent No.: US 8,540,377 B2
(45) Date of Patent: Sep. 24, 2013

(54) PROJECTOR LIGHT SOURCE DEVICE HAVING PROJECTIONS REGULATING COOLING AIRFLOW

(75) Inventor: Takuji Kawai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 354 days.

(21) Appl. No.: 12/723,877

(22) Filed: Mar. 15, 2010

(65) Prior Publication Data
US 2010/0231866 A1 Sep. 16, 2010

(30) Foreign Application Priority Data

Mar. 16, 2009 (JP) .................................. 2009-062407

(51) Int. Cl.
| G03B 21/16 | (2006.01) |
| G03B 21/18 | (2006.01) |
| G03B 21/26 | (2006.01) |
| G03B 21/28 | (2006.01) |
| F21V 7/20 | (2006.01) |
| F21V 29/00 | (2006.01) |

(52) U.S. Cl.
USPC .................. 353/99; 353/52; 353/57; 353/61; 353/98; 362/218; 362/264

(58) Field of Classification Search
USPC ....... 353/52, 57, 60–61, 85, 98–99; 362/218, 362/264, 294, 373
See application file for complete search history.

(56) References Cited

U.S. PATENT DOCUMENTS

| 7,549,771 | B2 | 6/2009 | Yamauchi et al. | |
| 8,287,139 | B2* | 10/2012 | Wada | 353/99 |
| 2007/0115439 | A1* | 5/2007 | Takezawa | 353/61 |
| 2010/0231867 | A1* | 9/2010 | Takezawa | 353/61 |
| 2010/0321645 | A1* | 12/2010 | Nagatani et al. | 353/99 |

FOREIGN PATENT DOCUMENTS

| JP | A-8-106812 | 4/1996 |
| JP | A-8-250071 | 9/1996 |
| JP | A-9-213129 | 8/1997 |
| JP | A-2005-148505 | 6/2005 |
| JP | A-2007-220435 | 8/2007 |
| JP | A 2007-335270 | 12/2007 |

* cited by examiner

*Primary Examiner* — Tony Ko
*Assistant Examiner* — Jori S Reilly-Diakun
(74) *Attorney, Agent, or Firm* — Oliff & Berridge, PLC

(57) ABSTRACT

A light source device, includes: an arc tube having a tube spherical portion containing a pair of electrodes disposed along an illumination axis, and a pair of sealing portions extending from both sides of the tube spherical portion; a reflector having a reflection portion disposed in the vicinity of one of the sealing portions of the arc tube for reflecting light emitted from the arc tube toward an illumination area; and a flow regulating unit including a plurality of projecting portions projecting in a direction approximately along the illumination axis to regulate the flow direction of cooling air, and a fixing portion for fixing the plural projecting portions to one of the sealing portions in the vicinity of the tube spherical portion.

15 Claims, 4 Drawing Sheets

PROJECTOR LIGHT SOURCE DEVICE HAVING PROJECTIONS REGULATING COOLING AIRFLOW

BACKGROUND

1. Technical Field

The present invention relates to a light source device and a projector including the light source device.

2. Related Art

A projector which forms a light image by modulating light emitted from a light source device and projects the formed light image on a screen or the like is known. The light source device contained in the projector includes an arc tube and a reflector for reflecting light emitted from the arc tube. The arc tube has a tube spherical portion containing a pair of electrodes, and sealing portions extending from both sides of the tube spherical portion.

According to this type of light source device, heat generated by light emission needs to be cooled such that the temperature of the arc tube can be adjusted to an appropriate temperature. Particularly, the temperature of the upper area of the tube spherical portion becomes higher than that of the lower area due to heat convection. For lowering the temperature of the upper area of the tube spherical portion (cooling the upper area), cooling air is generally supplied from the illumination area side above the tube spherical portion. That is, the cooling air is obliquely supplied to the tube spherical portion from a position above the illumination area side.

When the cooling air is obliquely supplied to the tube spherical portion from the position above the illumination area side, the connection area between the tube spherical portion and the pair of the sealing portions is easily cooled. In this case, the connection area between the tube spherical portion and the sealing portion located closer to the illumination area is cooled more easily depending on the way of flow of the cooling air. On the other hand, the upper area of the tube spherical portion is difficult to be cooled. Thus, when the cooling air is supplied to adjust the temperature of the upper area of the tube spherical portion to an appropriate temperature, the temperature of the connection area is excessively lowered (excessive cooling).

According to a technology disclosed in JP-A-2007-220435, the excessive cooling of the connection area between the tube spherical portion and the sealing portions is avoided by providing a heat insulating member on at least a part of either the tube spherical portion or the reflector side sealing portion.

However, the technology shown in JP-A-2007-220435 prevents only the excessive cooling of the sealing portions in the vicinity of the connection area and cannot effectively cool the upper area of the tube spherical portion generating a large amount of heat. Thus, efficient cooling of the upper area of the tube spherical portion is still required. When the low temperature of the connection area after the excessive cooling is maintained, the tube spherical portion may be blackened. On the contrary, when the excessively high temperature of the upper area of the tube spherical portion is maintained, the tube spherical portion may be whitened. When either of these phenomena occurs, the region of the tube spherical portion corresponding to the phenomena loses transparency and produces a factor which decreases the light amount of the arc tube.

The blackening refers to a phenomenon where evaporated atoms of a base material constituting an electrode (such as tungsten atoms) do not return to the electrode but adhere to the inner wall of the tube spherical portion when a halogen cycle of the base material is not performed due to the low temperature. The whitening refers to a phenomenon which whitens a base material constituting the tube spherical portion at the time of recrystallization caused by the high temperature.

Therefore, such a projector has been demanded which can prevent excessive cooling of the connection area between the tube spherical portion and the sealing portions, and can efficiently cool the upper area of the tube spherical portion.

SUMMARY

It is an advantage of some aspects of the invention to provide a technology capable of solving at least a part of the above problems.

First Aspect

A first aspect of the invention is directed to a light source device includes: (a) an arc tube has a tube spherical portion containing a pair of electrodes disposed along an illumination axis, and a pair of sealing portions extending from both sides of the tube spherical portion; (b) a reflector has a reflection portion disposed in the vicinity of one of the sealing portions of the arc tube for reflecting light emitted from the arc tube toward an illumination area; and (c) a flow regulating unit has a plurality of projecting portions projecting in a direction approximately along the illumination axis to regulate the flow direction of cooling air, and a fixing portion for fixing the plural projecting portions to one of the sealing portions in the vicinity of the tube spherical portion.

According to the light source device of this aspect, cooling air flowing along the plural projecting portions of the flow regulating unit can be easily supplied to the upper area of the tube spherical portion. Thus, heat on the upper area of the tube spherical portion can be efficiently cooled. Moreover, the plural projecting portions are fixed to the sealing portion in the vicinity of the tube spherical portion via the fixing portion. Accordingly, the temperature of the connection area between the tube spherical portion and the sealing portion to which the flow regulating unit is attached can be maintained, and thus excessive cooling can be avoided.

The upper and lower directions of the arc tube and the tube spherical portion refer to the upper and lower directions with respect to the direction of gravity in the environment where the arc tube and the tube spherical portion are placed.

Second Aspect

A second aspect of the invention is directed to the light source device of the above aspect, wherein the projecting portions are configured to interpose a virtual plane which passes the illumination axis and extends in the direction of gravity is interposed between the projecting portions.

According to the light source device of this aspect, the projecting portions are disposed in such positions that the virtual plane is interposed between the projecting portions. In this arrangement, the upper area or the lower area of the tube spherical portion as the area on the virtual plane is sandwiched between the projecting portions (positioned between the projecting portions). Thus, cooling air obliquely introduced to the flow regulating unit from a position above the illumination area side, for example, can be directed between the projecting portions and securely supplied to the upper area of the tube spherical portion. Accordingly, the upper area of the tube spherical portion can be securely cooled.

Third Aspect

A third aspect of the invention is directed to the light source device of the above aspects, wherein the plural projecting portions are configured to substantially symmetric with respect to the virtual plane.

According to the light source device of this aspect, the cooling of the arc tube is not affected by the difference between the position of the projecting portions in the normal use condition and the position of the projecting portions in the suspension use condition rotated upside-down. Accordingly, the advantages of the first aspect and the second aspect can be provided both in the normal condition and in the suspension condition.

Fourth Aspect

A fourth aspect of the invention is directed to the light source device according of the above aspects, wherein the fixing portion configured to tubular and insert through the sealing portion.

According to the light source device of this aspect, the flow regulating unit can be easily and securely fixed to the sealing portion by inserting the sealing portion through the cylindrical fixing portion and filling the clearance therebetween with an adhesive or the like.

Fifth Aspect

A fifth aspect of the invention is directed to the light source device of the above aspects, wherein the fixing portion having an inclined portion expanding toward the tube spherical portion along the illumination axis.

According to the light source device of this aspect, the cooling air can be directed along the inclined portion to be further securely supplied to the upper area of the tube spherical portion. Thus, the upper area of the tube spherical portion can be further efficiently cooled.

Sixth Aspect

A sixth aspect of the invention is directed to the light source device of the above aspects, wherein the flow regulating unit is set up an area out of an effective optical path.

According to the light source device of this aspect, the flow regulating unit disposed out of the effective optical path does not decrease the amount of light emitted from the light source device toward the illumination area. The effective optical path herein refers to an optical path of light emitted from the tube spherical portion of the arc tube and reflected by the reflector to be extracted to the outside of the light source device without blocked by the arc tube.

Seventh Aspect

A seventh aspect of the invention is directed to a projector includes: the light source device according any of the above aspects; and an optical modulation device configured to form an optical image by modulating light emitted from the light source device according to an image signal.

According to this aspect of the invention, the projector includes the light source device capable of preventing excessive cooling of the connection area between the tube spherical portion and the sealing portion and efficiently cooling the upper area of the tube spherical portion. Thus, the tube spherical portion is not blackened or whitened, and the life of the light source device of the projector can be increased.

BRIEF DESCRIPTION OF THE DRAWINGS

The invention will be described with reference to the accompanying drawings, wherein like numbers reference like elements.

FIGS. 3A and 3B illustrate expanded main parts of an arc tube and a flow regulating unit of the light source device, wherein: FIG. 3A is a cross-sectional view of the sides of the arc tube and the flow regulating unit; and FIG. 3B is a front view as viewed from the flow regulating unit side, showing the sealing portion located closer to the illumination area and cut along a plane orthogonal to the illumination axis.

FIGS. 4A and 4B illustrate the external appearances of the main parts of the arc tube and the flow regulating unit of the light source device, wherein: FIG. 4A is a side view of the arc tube and the flow regulating unit; and FIG. 4B is a perspective view of the flow regulating unit as viewed from above the illumination area side.

DESCRIPTION OF EXEMPLARY EMBODIMENT

An exemplary embodiment according to the invention is hereinafter described with reference to the drawings.

Embodiment

Figure 1:
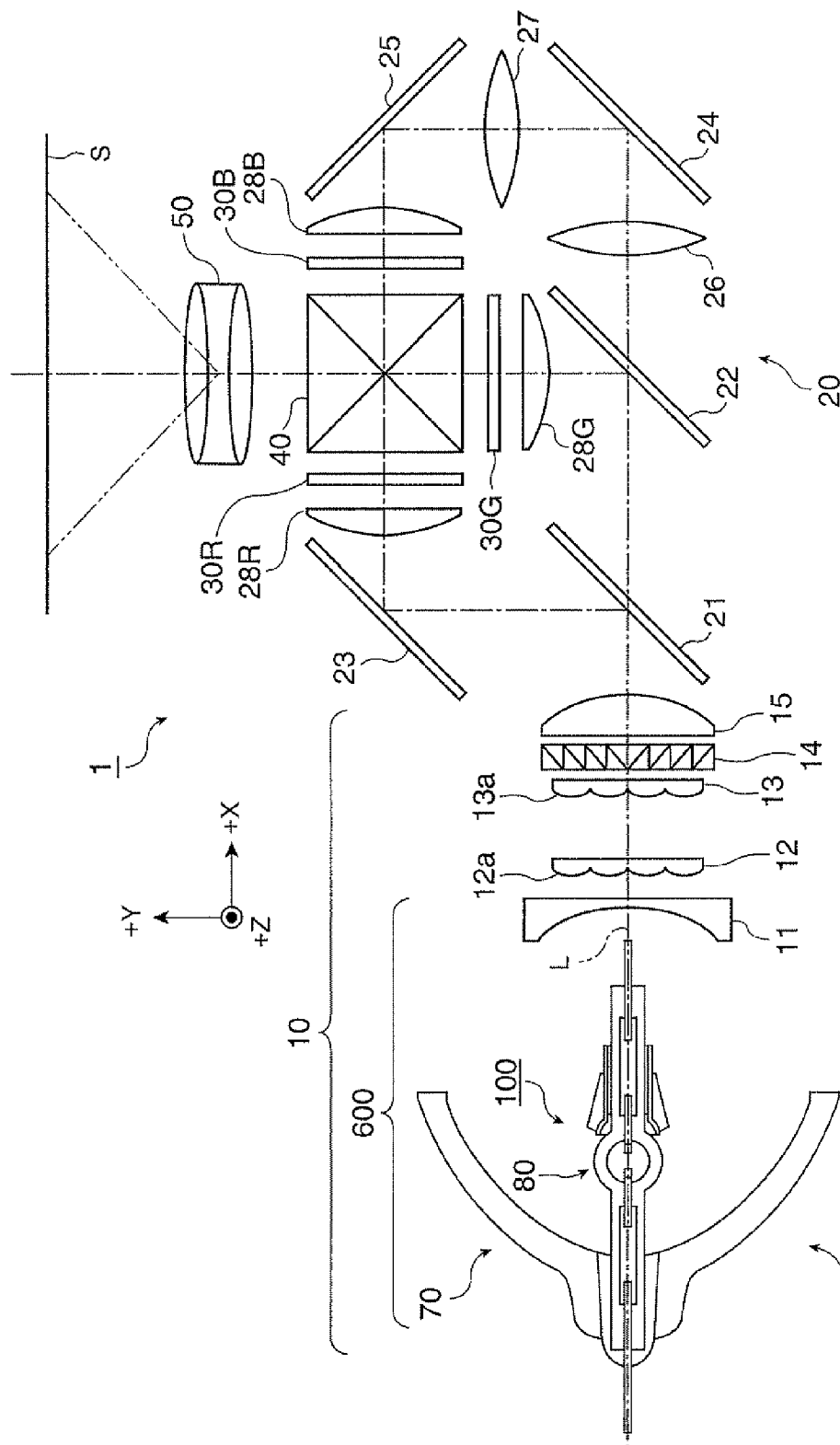
FIG. 1 illustrates optical systems of a projector according to an embodiment.

FIG. 1 illustrates optical systems included in a projector according to this embodiment.

The structure and operation of the optical systems of a projector 1 are now explained with reference to FIG. 1.

The figures describing this embodiment (FIG. 1 and FIGS. 2 through 4B described later) show an XYZ orthogonal coordinate system indicating an X axis direction as a direction of an illumination axis L of light emitted from a light source device 60 toward an illumination area, a Y axis direction as a direction orthogonal to the X axis direction and parallel with the sheet surface of FIG. 1, and a Z axis direction as a direction orthogonal to the X axis direction and perpendicular to the sheet surface of FIG. 1. The +X direction corresponds to the light traveling direction. The +Y direction corresponds to the left direction with respect to the +X direction. The +Z direction corresponds to the upper direction with respect to the +X direction.

The projector 1 according to this embodiment has optical systems. The optical systems form an optical image by modulating light emitted from the light source device 60 according to image signals, and project a projection image to a projection target surface such as a screen S through a projection system 50.

The optical systems of the projector 1 include an integrator illumination system 10, a color separation and light guide system 20, an optical modulation device, a color combining system, and the projection system 50. The integrator illumination system 10 is an optical system for equalizing illuminance of light emitted from the light source device 60 within a plane orthogonal to the illumination axis L. The color separation and light guide system 20 separates illumination light received from the integrator illumination system 10 into three color lights in red (R), green (G), and blue (B), and guides the divided color lights to the illumination area.

The optical modulation device is an optical system which modulates each of the three color lights separated by the color separation and light guide system 20 according to image signals, and includes three liquid crystal devices 30R, 30G, and 30B corresponding to the three color lights in red (R), green (G), and blue (B). The color combining system combines optical images modulated by the optical modulation device (the three liquid crystal devices 30R, 30G, and 30B), and includes a cross dichroic prism 40. The projection system 50 is an optical system which projects an optical image produced by combining the optical images in the respective colors using the color combining system (the cross dichroic prism 40) to the projection target surface such as the screen S.

The integrator illumination system 10 includes the light source device 60 for emitting illumination light toward the illumination area, a concave lens 11 for releasing converged light from the light source device 60 as substantially parallel light, and a first lens array 12 having a plurality of first small lenses 12a for dividing the illumination light released from the concave lens 11 into a plurality of partial lights.

The integrator illumination system 10 further includes a second lens array 13 having a plurality of second small lenses 13a corresponding to the plural first small lenses 12a of the first lens array 12, a polarization converting element 14 which converts the partial lights released from the second lens array 13 into substantially one type of linear polarized lights having the same polarization direction and releases the converted lights, and a stacking lens 15 for stacking the respective partial lights released from the polarization converting element 14 on the illumination area.

As illustrated in FIG. 1, the light source device 60 includes a reflector 70, an arc tube 80 having the light emission center in the vicinity of a first focus of the reflector 70, and a flow regulating unit 100 for regulating the flow direction of cooling air. The light source device 60 emits light having the illumination axis L as the center axis. The details of the structure and operation of the light source device 60 will be described after the explanation of the optical systems of the projector 1.

The concave lens 11 is disposed on the illumination area of the reflector 70. The concave lens 11 is so designed as to direct the light from the reflector 70 toward the first lens array 12.

The first lens array 12 functions as a light dividing optical element for dividing light from the concave lens 11 into plural partial lights, and has the plural first small lenses 12a disposed in matrix having plural lines and plural rows within a plane orthogonal to the illumination axis L. Each external shape of the first small lenses 12a is similar to each external shape of the image forming areas of the liquid crystal devices 30R, 30G, and 30B.

The second lens array 13 forms respective images of the first small lenses 12a of the first lens array 12 in the vicinity of the image forming areas of the liquid crystal devices 30R, 30G, and 30B in cooperation with the stacking lens 15. The second lens array 13 has structure substantially similar to that of the first lens array 12, containing the plural second small lenses 13a disposed in matrix having plural lines and plural rows within a plane orthogonal to the illumination axis L.

The polarization converting element 14 is a polarizing element which converts the respective partial lights divided by the first lens array 12 into substantially one type of linear polarized lights having the same polarization direction and releases the converted lights. The polarization converting element 14 has a polarization dividing layer, a reflection layer, and a retardation film. The polarization dividing layer transmits one of the linear polarized light components of the polarized light components contained in the light emitted from the light source device 60 and reflects the other linear polarized light component in a direction perpendicular to the illumination axis L. The reflection layer reflects the other linear polarized light component reflected by the polarization dividing layer in a direction parallel with the illumination axis L. The retardation film converts the one linear polarized light component transmitted by the polarization dividing layer into the other linear polarized light component.

The stacking lens 15 is an optical element which converges the plural partial lights having passed the first lens array 12, the second lens array 13, and the polarization converting element 14 and stacks the converged partial lights in the vicinity of the image forming areas of the liquid crystal devices 30R, 30G, and 30B. The stacking lens 15 is disposed in such a position that the optical axis of the stacking lens 15 almost coincides with the illumination axis L of the integrator illumination system 10. The stacking lens 15 may be a compound lens produced by combining plural lenses.

The color separation and light guide system 20 has dichroic mirrors 21 and 22, reflection mirrors 23, 24, and 25, an entrance side lens 26, a relay lens 27, and converging lenses 28R, 28G, and 28B. The color separation and light guide system 20 separates the illumination light released from the stacking lens 15 into three color lights of red light, green light, and blue light, and guides the respective color lights to the three liquid crystal devices 30R, 30G, and 30B as the illumination targets.

The liquid crystal devices 30R, 30G, and 30B which modulate illumination lights according to image signals are the illumination targets of the integrator illumination system 10. Each of the liquid crystal devices 30R, 30G, and 30B has liquid crystals as electro-optic substances sealed between a pair of transparent glass base materials, and modulates the polarization direction of the one type of the linear polarized lights released from entrance side polarization plates described later according to inputted image signals by using polysilicon TFT as switching elements, for example.

The converging lenses 28R, 28G, and 28B for controlling the incident angles are disposed on the optical path before the liquid crystal devices 30R, 30G, and 30B. Though not shown in the figure, the entrance side polarization plates are interposed between the converging lens 28R and the liquid crystal device 30R, between the converging lens 28G and the liquid crystal device 30G, and between the converging lens 28B and the liquid crystal device 30B, and exit side polarization plates are interposed between the liquid crystal device 30R and the cross dichroic prism 40, between the liquid crystal device 30G and the cross dichroic prism 40, and between the liquid crystal device 30B and the cross dichroic prism 40. The respective entering color lights are modulated by the entrance side polarization plates, the liquid crystal devices 30R, 30G, and 30B, and the exit side polarization plates.

The cross dichroic prism 40 is an optical device which combines the optical images emitted from the exit side polarization plates and modulated for each color light into a color image. The cross dichroic prism 40 has a substantially square shape in the plan view produced by affixing four rectangular prisms, and dielectric multilayer films are provided on the interfaces of the rectangular prisms affixed to one another in an approximately X shape. The dielectric multilayer film formed on one of the interfaces in the substantially X shape reflects the red light, and the dielectric multilayer film formed on the other interface reflects the blue light. The red light and the blue light are bent by the dielectric multilayer films in the same direction as the traveling direction of the green light such that the three color lights can be combined.

The color image released from the cross dichroic prism 40 is expanded and projected by the projection system 50 to form a projection image on the screen S as the projection target surface.

Figure 2:
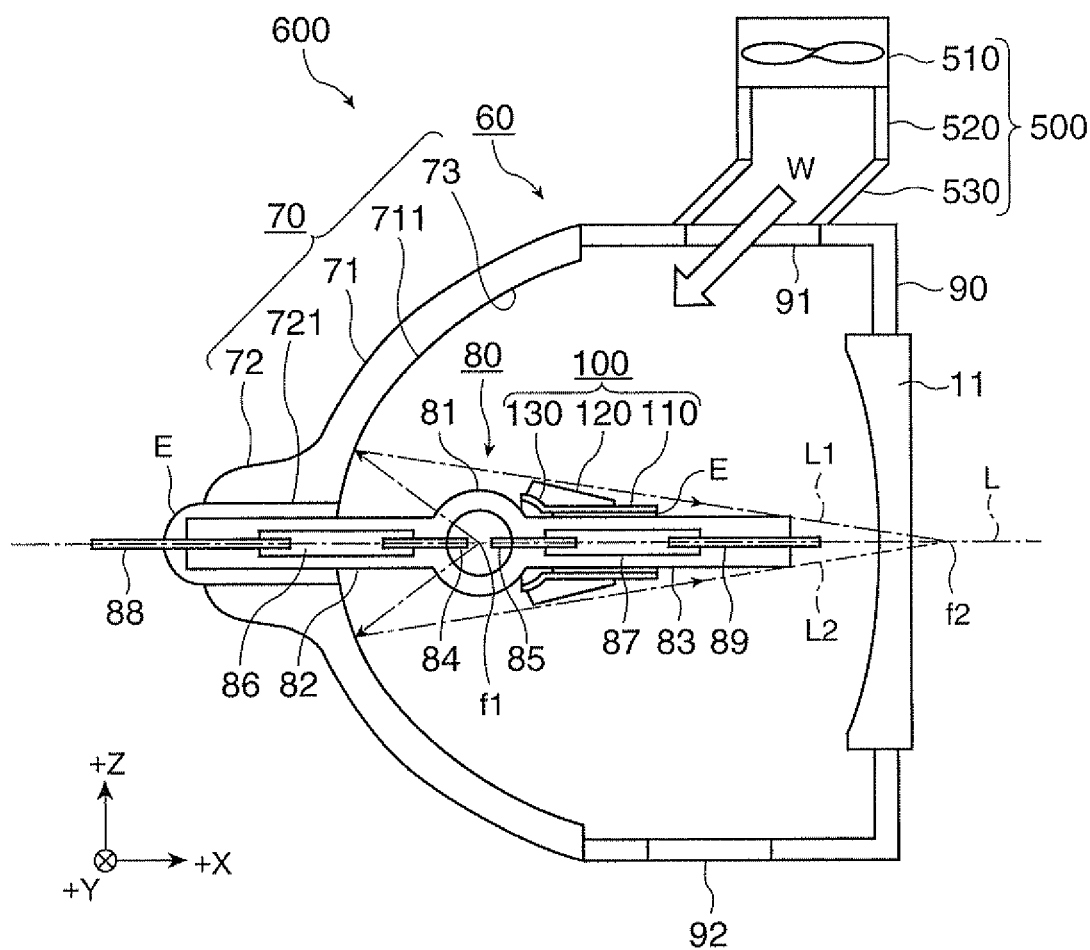
FIG. 2 is a cross-sectional view showing the side of a light source device.
Figure 3A:
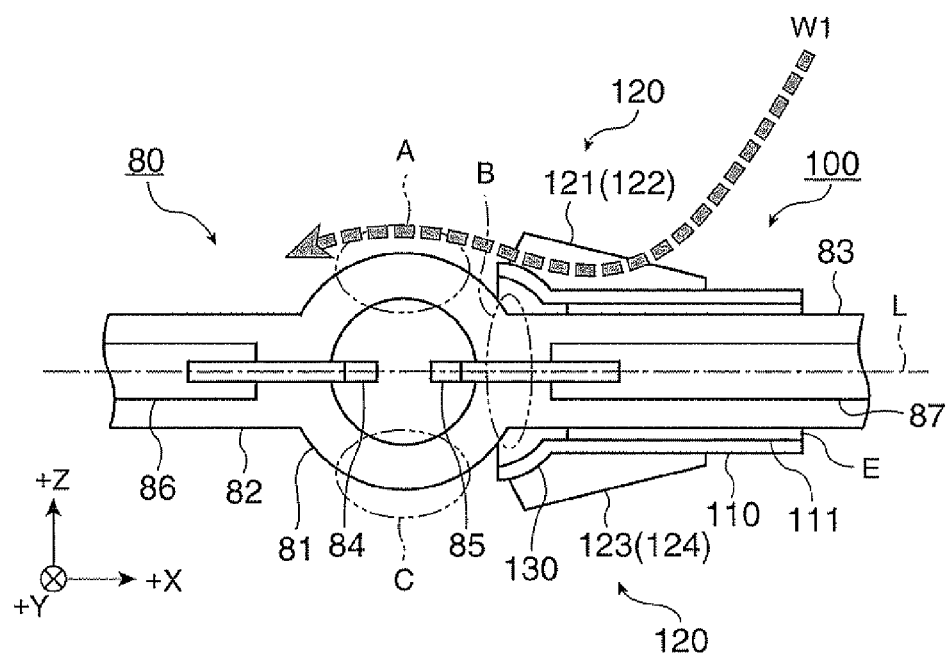
Figure 3B:
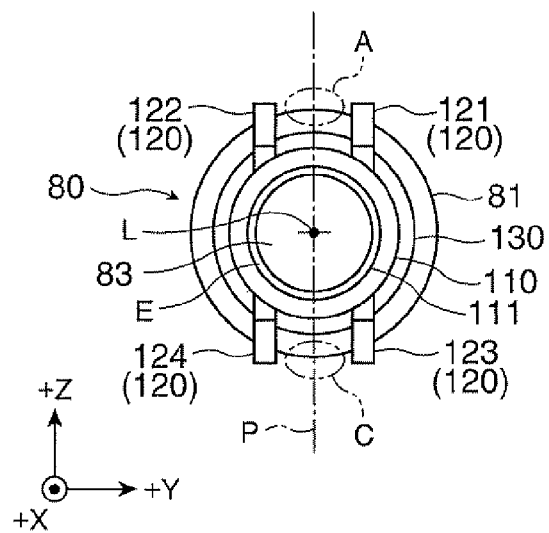
Figure 4A:
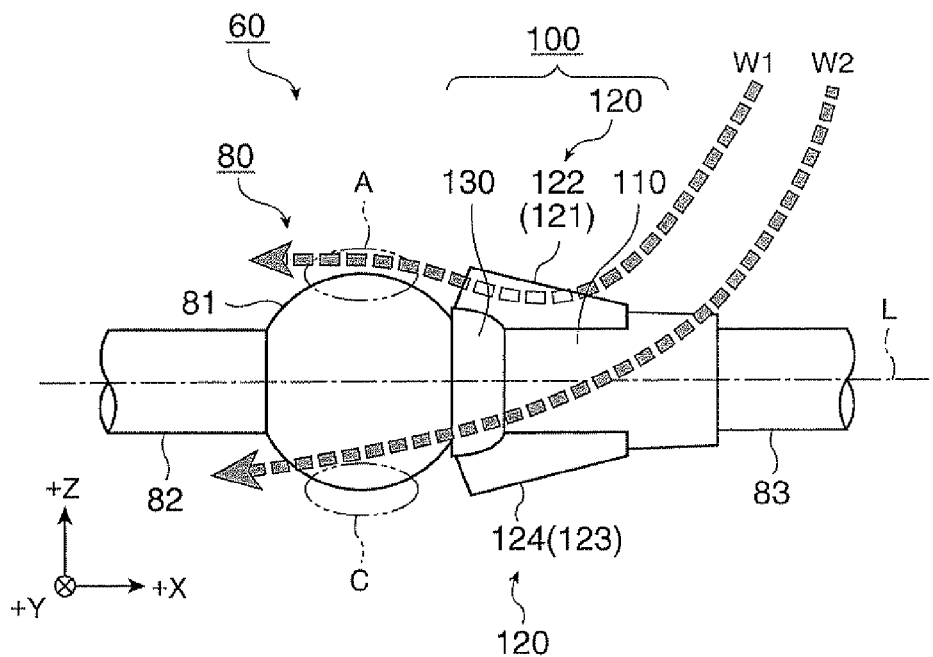
Figure 4B:
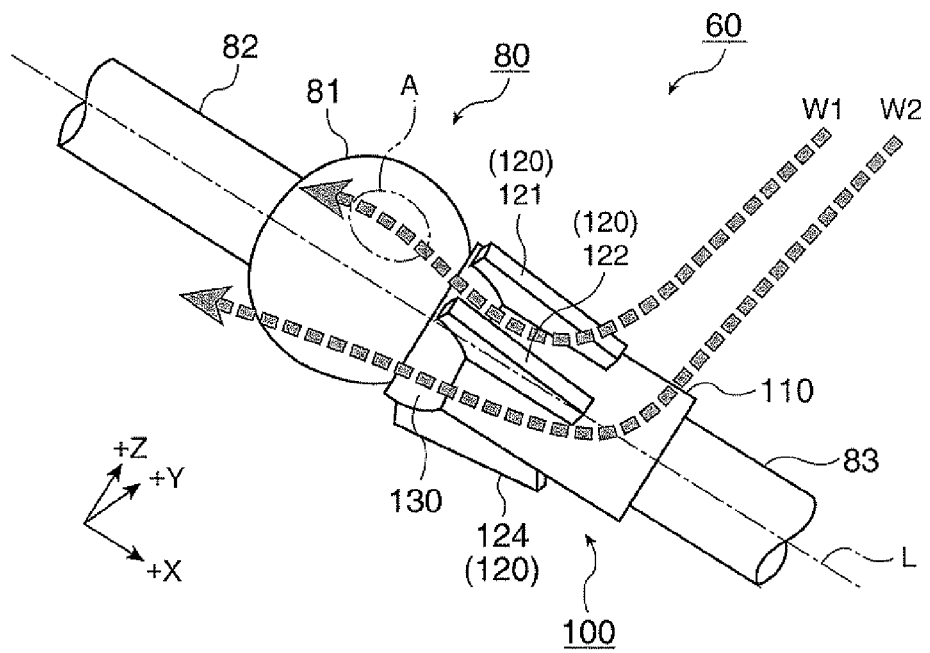

FIG. 2 is a cross-sectional view illustrating the side of the light source device. FIGS. 3A and 3B illustrates the expanded main parts of the arc tube and the flow regulating unit of the light source device: wherein FIG. 3A is a cross-sectional view showing the sides of the arc tube and the flow regulating unit; and FIG. 3B is a front view as viewed from the flow regulating unit side, showing the sealing portion located closer to the illumination area and cut along a plane orthogonal to the illumination axis. FIGS. 4A and 4B illustrate the external appearances of the main parts of the arc tube and the flow regulating unit of the light source device: wherein FIG. 4A is a side view of the arc tube and the flow regulating unit; and FIG. 4B is a perspective view of the flow regulating unit as viewed from above the illumination area side. FIG. 2 shows a light source unit 600 containing the light source device 60.

The structure and operation of the light source device 60 are now described with reference to FIGS. 2 through 4B.

As illustrated in FIG. 2, the light source unit 600 in this embodiment includes the light source device 60, the concave lens 11, and a housing 90 for accommodating the light source device 60 and the concave lens 11. A cooling mechanism 500 for cooling heat generated from the light source device 60 is further provided in such a position as to face the light source unit 600 when the light source unit 600 is accommodated at a predetermined position inside the projector 1.

As illustrated in FIG. 2, the light source device 60 includes the reflector 70, the arc tube 80 having the light emission center in the vicinity of the first focus of the reflector 70, and the flow regulating unit 100 for regulating the flow direction of cooling air W. The light source device 60 emits light having the illumination axis L as the center axis.

As can be seen from FIG. 2, the reflector 70 includes a reflector main body 71 having an ellipsoidal concave surface 711, and a cylindrical portion 72 through which an end of a sealing portion (one sealing portion) 82 of the arc tube 80 described later is inserted to be fixed to the cylindrical portion 72. The reflector main body 71 and the cylindrical portion 72 constituting the reflector 70 are formed integrally with each other. A reflection layer 73 as a reflection portion having high reflectance is provided on the concave surface 711 of the reflector main body 71.

The cylindrical portion 72 is a cylindrical body provided on the surface opposite to the reflection layer 73 in such a manner as to extend from the centers of the reflection layer 73 and the reflector main body 71. An opening 721 is formed inside the cylindrical portion 72 such that the end of the sealing portion 82 of the arc tube 80 described later can be inserted through the opening 721 and fixed thereto. The arc tube 80 described later is fixed to the cylindrical portion 72 of the reflector 70 by inserting the end of the sealing portion 82 through the opening 721 and filling the clearance between the opening 721 and the sealing portion 82 with an inorganic adhesive E such as cement with alignment of the opening 721 and the sealing portion 82 with respect to the reflection layer 73.

Preferable examples of the base material for constituting the reflector 70 (the reflector main body 71 and the cylindrical portion 72) are crystallized glass and alumina ($Al_2O_3$). The reflection layer 73 is formed by dielectric multilayer film made of titanium oxide ($TiO_2$) and silicon oxide ($SiO_2$).

As illustrated in FIG. 2, the arc tube 80 includes a tube spherical portion 81 having a spherical shape, and a pair of the sealing portion 82 and a sealing portion 83 extending from both sides of the tube spherical portion 81 along the illumination axis L. The arc tube 80 has a pair of electrodes 84 and 85 contained in the tube spherical portion 81 and disposed close to and opposed to each other along the illumination axis L, a pair of metal foils 86 and 87 sealed within the pair of sealing portions 82 and 83, respectively, and a pair of leads 88 and 89 electrically connected with the metal foils 86 and 87, respectively.

The conditions and the like of the elements included in the arc tube 80 are as follows, for example. The tube spherical portion 81 and the sealing portions 82 and 83 are made of quartz glass or the like, and mercury, rare gas, and a small amount of metal halogenated material are sealed into the tube spherical portion 81. The electrodes 84 and 85 are tungsten electrodes or the like, and the metal foils 86 and 87 are molybdenum foils or the like. The leads 88 and 89 are made of molybdenum or tungsten, for example. The arc tube 80 can be formed by various types of arc tube capable of emitting light having high luminance, such as a high-pressure mercury lamp, an extra-high pressure mercury lamp, and a metal halide lamp.

In this embodiment, the flow regulating unit 100 is a component disposed on the sealing portion (the other sealing portion) 83 in the vicinity of the tube spherical portion 81 to regulate the flow direction of the cooling air W. The flow regulating unit 100 has a fixing portion 110, projecting portions 120, and an inclined portion 130.

The fixing portion 110 as a cylindrical component has an opening 111 through which the sealing portion 83 of the arc tube 80 is inserted to be fixed to the opening 111.

The inclined portion 130 is formed at the end of the fixing portion 110 at a position close to the tube spherical portion 81, and has a shape expanding toward the tube spherical portion 81 in the direction of the illumination axis L. More specifically, the inclined portion 130 has a substantially bowl shape whose radius increases from the radius of the fixing portion 110 in correspondence with the shape of the tube spherical portion 81. When the flow regulating unit 100 is fixed to the sealing portion 83, the inner surface of the inclined portion 130 is brought into such a condition as to cover a connection area B between the tube spherical portion 81 and the sealing portion 83.

The projecting portions 120 are plural components each of which projects from the outer surface of the fixing portion 110 in a direction approximately along the illumination axis L. As illustrated in FIG. 3B, the projecting portions 120 are disposed with a virtual plane P interposed therebetween, which virtual plane P passes the illumination axis L in the direction of gravity. Also, the projecting portions 120 are located substantially symmetric with respect to the virtual plane P. In FIGS. 2 through 4B, the virtual plane P corresponds to the X-Z plane passing the illumination axis L. In this case, an upper area A or a lower area C of the tube spherical portion 81 corresponds to an area on the virtual plane P.

More specifically, the projecting portions 120 are constituted by four projecting portions 121, 122, 123, and 124 as illustrated in FIG. 3B. The two projecting portions 121 and 122 are disposed symmetric with respect to the virtual plane P with the virtual plane P interposed between the projecting portions 121 and 122. Similarly, the two projecting portions 123 and 124 are disposed symmetric with respect to the virtual plane P with the virtual plane P interposed between the projecting portions 123 and 124. In this arrangement, the area A in the upper region of the tube spherical portion 81 is sandwiched between the two projecting portions 121 and 122 (positioned between the projecting portions 121 and 122), and the area C in the lower region of the tube spherical portion 81 is sandwiched between the two projecting portions 123 and 124 (positioned between the projecting portions 123 and 124).

As illustrated in FIGS. 3A and 3B and FIGS. 4A and 4B, each of the projecting portions 120 has a substantially triangular plate shape which expands toward the outer surface of the fixing portion 110 and has a vertex shifted toward the tube spherical portion 81. Each of the two projecting portions 121 and 122 extends substantially parallel with the virtual plane P. Similarly, each of the two projecting portions 123 and 124 extends substantially parallel with the virtual plane P. Each of the distances between the virtual plane P and the projecting portions 121, 122, 123, and 124 is set substantially equal. That is, the flow regulating unit 100 has a rotation-symmetric shape with respect to the illumination axis L as the rotation axis, whose shape becomes symmetric by rotations through 180 degrees and 360 degrees. Thus, when the condition of the light source device 60 is switched from the normal condition to the suspension condition in an upside-down position, substantially no change of the position of the projecting portions 120 is produced with respect to the arc tube 80.

The normal condition herein refers to the condition in which the projector 1 including the light source device 60 is placed on a desk or the like for use. The suspension condition refers to the condition in which the projector 1 is rotated upside-down and suspended from a jig provided on a ceiling or the like. In this case, the light source device 60 contained in the projector 1 is also positioned upside-down when the normal condition is switched to the suspension condition.

The flow regulating unit 100 having this structure is fixed to the sealing portion 83 by inserting the sealing portion 83 through the opening 111 of the fixing portion 110 and filling the clearance between the opening 111 and the sealing portion 83 with the inorganic adhesive E such as cement.

As illustrated in FIG. 2, the flow regulating unit 100 is disposed in an area out of the effective optical path of light emitted from the arc tube 80 so as not to block the light coming from the arc tube 80. More specifically, usable limit lights L1 and L2 emitted from the center of the tube spherical portion 81 (the centers of the electrodes 84 and 85 as a so-called a first focus position f1 of the reflector 70) and reflected by the reflection layer 73 of the reflector 70 are so designed as to pass through areas outside the projecting portions 120 of the flow regulating unit 100 and enter the concave lens 11.

Further specifically, the usable limit lights L1 and L2 are expressed by boundary lines connecting a second focus position f2 of the reflector 70 and the ends of the sealing portion 83 on the light emission side. The inside of the cone indicated by the usable limit lights L1 and L2 corresponds to a light unusable area (out of the effective optical path) where the lights reflected by the reflector 70 are blocked by the sealing portion 83 and thus cannot be supplied to the second focus position f2. In other words, the boundary lines L1 and L2 connecting the second focus position f2 of the reflector 70 and the ends of the sealing portion 83 on the light emission side correspond to boundary lights on the boundaries between the lights reflected by the reflector 70 and reaching the second focus position f2 and the lights reflected by the reflector 70 and blocked by the sealing portion 83. Since the projecting portions 120 of the flow regulating unit 100 are disposed inside the area surrounded by the usable limit lights L1 and L2 (out of the effective optical path), the lights emitted from the arc tube 80 are not blocked by the flow regulating unit 100 and thus can be effectively used.

The material for constituting the flow regulating unit 100 is quartz glass, for example. Alternatively, low thermal expansion glass such as neoceram (registered trademark), metal, ceramic or the like may be used.

The housing 90 made of resin having high heat resistance or the like fixes the reflector 70 and the concave lens 11. The housing 90 isolates a space formed between the reflector 70 and the concave lens 11 from the surroundings to prevent leakage of unnecessary light emitted from the arc tube 80 to the outside as stray light. An air intake port 91 is formed on the upper wall surface of the housing 90 in the +Z direction as the side surface of the housing 90. Also, an air discharge port 92 is formed on the lower wall surface of the housing 90 in the −Z direction. Air for cooling (the cooling air W) is introduced from the outside through the air intake port 91, and air after cooling is discharged through the air discharge port 92 to the outside.

The cooling mechanism 500 is a cooling device which cools heat generated by light emission from the tube spherical portion 81 of the arc tube 80 in cooperation with the air intake port 91, the air discharge port 92 and the like. The cooling mechanism 500 includes a cooling fan 510 for delivering the cooling air W, a duct 520 for introducing the generated cooling air W to the air intake port 91 of the housing 90, a louver 530 for controlling the flow direction of the cooling air W flowing through the air intake port 91 toward the space of the housing 90 (the space of the light source unit 600), and other parts. A discharge duct (not shown) is further provided inside the projector 1 in such a position as to face the air discharge port 92. The heated cooling air W passing through the air discharge port 92 is finally discharged through the discharge duct to the outside of the projector 1.

As illustrated in FIG. 2, the cooling air W having the flow direction regulated by the louver 530 of the cooling mechanism 500 is introduced to the space of the housing 90 through the air intake port 91, and supplied to the arc tube 80 (the tube spherical portion 81). Thus, the cooling air W is obliquely supplied to the tube spherical portion 81 from a position above the illumination area side (+Z direction).

The flows of cooling airs W1 and W2 (indicated by broken lines with arrows) introduced to the space of the light source unit 600 through the air intake port 91 by the operation of the cooling mechanism 500 are now described with reference to FIGS. 3A and 3B and FIGS. 4A and 4B.

As illustrated in FIGS. 3A and 3B and FIGS. 4A and 4B, the cooling air W1 contained in the cooling air W is obliquely supplied (introduced) to the flow regulating unit 100 from a position above the illumination area side (+Z direction). Then, the cooling air W1 flows along the area surrounded by the fixing portion 110 and the projecting portions 121 and 122 toward the tube spherical portion 81 by the function of the flow path of the area surrounded by the fixing portion 110 and the projecting portions 121 and 122 for regulating the flow direction of the cooling air W1. The cooling air W1 having reached the tube spherical portion 81 is further directed upward (+Z direction) by the inclined portion 130.

Thus, the cooling air W1 having the flow direction regulated by the flow regulating unit 100 and passing through the flow regulating unit 100 flows to the area A in the upper area of the tube spherical portion 81. As a result, the area A in the upper region of the tube spherical portion 81 can be efficiently cooled by the cooling air W1 flowing in the direction regulated by the flow regulating unit 100 as well as cooling air directly supplied to the area A.

On the other hand, the cooling air W2 contained in the cooling air W is obliquely supplied (introduced) to the flow regulating unit 100 from a position above the illumination area side (+Z direction) similarly to the cooling air W1 as illustrated in FIGS. 4A and 4B. Then, the cooling air W2 flows along the area surrounded by the fixing portion 110 and the projecting portions 122 and 124 toward the tube spherical portion 81 by the function of the flow path of the area surrounded by the fixing portion 110 and the projecting portions 122 and 124 for regulating the flow direction of the cooling air W2. The cooling air W2 having reached the tube spherical portion 81 is further directed to the side direction (−Y direction) by the inclined portion 130.

Thus, the cooling air W2 having the flow direction regulated by the flow regulating unit 100 and moving away from the flow regulating unit 100 flows to an area on the side (side surface) of the tube spherical portion 81. As a result, the side surface of the tube spherical portion 81 can be cooled by the cooling air W2 flowing in the direction regulated by the flow regulating unit 100 as well as cooling air directly supplied to the side surface.

Though not shown in the figure, the flow direction of the cooling air W is also regulated by the fixing portion 110 and the projecting portions 121 and 123 in the +Y direction of the flow regulating unit 100 similarly to the flow of the cooling air W2. Thus, the side surface of the tube spherical portion 81 in the +Y direction is cooled similarly to the side surface in the –Y direction.

Other cooling air (not shown) including the cooling air W2 is prevented from flowing along the lower area (–Z direction) of the tube spherical portion 81 by the function of the projecting portions 123 and 124 for regulating the flow direction. Thus, the area C in the lower region of the tube spherical portion 81 is not excessively cooled by the function of the projecting portions 123 and 124.

Moreover, in the structure which fixes the flow regulating unit 100 to the sealing portion 83 in the vicinity of the tube spherical portion 81, the cooling air W is difficult to be supplied to the connection area B between the tube spherical portion 81 and the sealing portion 83 (see FIG. 3A). Thus, the temperature of the connection area B is maintained without excessive cooling thereat. In this embodiment, the connection area B is covered by the inclined portion 130 of the flow regulating unit 100.

In this embodiment, the following advantages are provided.

(1) According to the light source device 60 in this embodiment, the cooling air W1 is guided along the two projecting portions 121 and 122 of the flow regulating unit 100 so as to be easily introduced to the area A in the upper region of the tube spherical portion 81. Thus, heat on the area A in the upper region of the tube spherical portion 81 can be efficiently cooled. Moreover, in the structure which fixes the flow regulating unit 100 to the sealing portion 83 in the vicinity of the tube spherical portion 81, the temperature of the connection area B between the tube spherical portion 81 and the sealing portion 83 is maintained by the flow regulating unit 100. Thus, excessive cooling is avoided.

(2) According to the light source device 60 in this embodiment, the four projecting portions 120 (121, 122, 123, and 124) are disposed in such positions that the virtual plane P is sandwiched between the projecting portions 120. In this case, the area A in the upper region and the area C in the lower region of the tube spherical portion 81 corresponding to the areas on the virtual plane P are surrounded by the projecting portions 120. Thus, the cooling air W1 obliquely flowing toward the flow regulating unit 100 from a position above the illumination area side is regulated in such a manner as to flow between the projecting portions 121 and 122. Accordingly, the cooling air W1 can be securely supplied to the area A in the upper region of the tube spherical portion 81 to securely cool the area A in the upper region of the tube spherical portion 81. Moreover, other cooling air including the cooling air W2 is regulated in such a manner as to flow between the projecting portions 122 and 124 and between the projecting portions 121 and 123, and thus can cool the side surface of the tube spherical portion 81. Furthermore, the flow direction of other cooling air including the cooling air W2 is prevented from flowing along the lower region of the tube spherical portion 81 by the function of the projecting portions 123 and 124 for regulating the flow direction. Thus, the area C in the lower region of the tube spherical portion 81 is not excessively cooled.

(3) According to the light source device 60 in this embodiment, the four projecting portions 120 (121, 122, 123, and 124) are disposed substantially symmetric with respect to the virtual plane P. Thus, the cooling effect on the arc tube 80 by the difference between the position of the projecting portions 120 in the normal use condition and the position of the projecting portions 120 in the suspension use condition rotated upside-down is reduced. Accordingly, the above advantages can be provided both in the normal condition and in the suspension condition.

In this case, an air discharge port (not shown) on the upper wall surface of the housing 90 in the +Z direction and an air intake port (not shown) on the lower wall in the –Z direction are added to the cooling mechanism 500, for example. Also, the duct 520 of the cooling mechanism 500 is branched in two directions and connected to the air intake ports in the +Z direction and the –Z direction. In addition, a switching unit (not shown) for switching such that the cooling air W can always flow toward the air intake port positioned at the upper position in the direction of gravity at the time of switching the position is provided to the cooling mechanism 500. By this modification, the cooling mechanism 500 can be used both in the normal condition and the suspension condition.

(4) According to the light source device 60 in this embodiment, the fixing portion 110 of the flow regulating unit 100 is a cylindrical component, and the sealing portion 83 is inserted through the opening 111 and fixed thereto. Thus, the flow regulating unit 100 can be easily and securely fixed to the sealing portion 83.

(5) According to the light source device 60 in this embodiment, the fixing portion 110 of the flow regulating unit 100 has the inclined portion 130 expanding toward the tube spherical portion 81 along the illumination axis L. In this case, the cooling air W1 can be introduced along the inclined portion 130, and thus can be further securely supplied to the area A in the upper region of the tube spherical portion 81. Accordingly, the area A in the upper region of the tube spherical portion 81 can be further efficiently cooled. Moreover, the cooling air W2 and other cooling air can be similarly introduced along the inclined portion 130 to be further securely supplied to the side surface of the tube spherical portion 81. Thus, the side surface of the tube spherical portion 81 can be efficiently cooled.

(6) According to the light source device 60 in this embodiment, the flow regulating unit 100 is disposed out of the effective optical path. In this case, light emitted from the arc tube 80 is not blocked by the flow regulating unit 100. Thus, the amount of light released from the light source device 60 toward the illumination area is not lowered.

(7) According to the light source device 60 in this embodiment, the area A in the upper region of the tube spherical portion 81 can be efficiently cooled by the flow regulating unit 100. In this case, the connection area B between the tube spherical portion 81 and the sealing portion 83 is not excessively cooled. Also, the area C in the lower region of the tube spherical portion 81 is not excessively cooled. That is, the temperature of the arc tube 80 does not locally become a high temperature or a low temperature, thereby providing appropriate temperature distribution of the arc tube 80. Accordingly, the tube spherical portion 81 is not whitened or blackened, and problems such as decrease in the light amount caused by loss of transparency of the tube spherical portion 81 and corruption of the tube spherical portion 81 by development of whitening or blackening are prevented. Therefore, the life of the light source device 60 can be increased.

(8) According to the light source device 60 in this embodiment capable of providing the above advantages, the number of revolutions of the cooling fan 510 can be made smaller than that of a cooling fan in related art. Thus, the noise of the projector 1 can be reduced. Moreover, the power consumption of the cooling fan 510 during operation can be decreased.

(9) According to the projector 1 in this embodiment which includes the light source device 60 providing the above advantages, the life of the light source device 60 can be increased. Thus, the quality of brightness of projection images can be maintained for a long period. Moreover, the number of times for replacing the light source device 60 is lowered, and therefore the amount of produced industrial waste can be reduced.

The invention is not limited to the embodiment described herein, but may be practiced otherwise without departing from the scope and spirit of the invention. As such, various changes and improvements including the following modifications may be made.

Modified Example 1

The reflector 70 of the light source device 60 in this embodiment includes the ellipsoidal concave surface 711. However, the reflector 70 may have a parabolic concave surface. In this case, the concave lens 11 used in this embodiment can be eliminated. Even when the parabolic concave surface is employed, loss of light from the arc tube caused by blockage of the flow regulating unit can be avoided by disposing the flow regulating unit in an area out of the effective optical path. Thus, the amount of light emitted from the light source device toward the illumination area is not lowered.

Modified Example 2

According to this embodiment, the fixing portion 110 of the flow regulating unit 100 is a cylindrical component. However, the shape of the fixing portion 110 is not limited to a cylindrical shape but may be other shapes as long as the fixing portion 110 can support the projecting portions 120 and can be attached to the sealing portion 83.

Modified Example 3

According to this embodiment, the flow regulating unit 100 is disposed on the other sealing portion 83 in the vicinity of the tube spherical portion 81. However, the same advantages are provided even when the flow regulating unit is disposed on the one sealing portion 82 in the vicinity of the tube spherical portion 81. In this case, the flow regulating unit is disposed inside a cone-shaped area (out of the effective optical path) defined by a conical angle formed by usable limit lights emitted from the first focus position f1 toward the reflection layer 73 as an area not effectively used as the optical path of light emitted from the arc tube 80 so as to effectively use the light from the arc tube 80.

Modified Example 4

According to this embodiment, the flow regulating unit 100 is disposed on the other sealing portion 83 in the vicinity of the tube spherical portion 81. However, the flow regulating unit may be disposed on each of the two sealing portions 82 and 83 in the vicinity of the tube spherical portion 81.

Modified Example 5

According to this embodiment, the fixing portion 110 of the flow regulating unit 100 has the inclined portion 130. However, the inclined portion 130 may be eliminated.

Modified Example 6

According to this embodiment, the projecting portions 120 of the flow regulating unit 100 are disposed substantially symmetric with respect to the virtual plane P. However, the projecting portions 120 are not required to be positioned symmetric, though the effect of the positional difference between the normal condition and the upside-down condition is slightly produced.

Modified Example 7

According to this embodiment, the projecting portions 120 of the flow regulating unit 100 are constituted by the four projecting portions 121, 122, 123, and 124. However, the number of the projecting portions may be arbitrarily determined.

Modified Example 8

According to this embodiment, each of the projecting portions 120 of the flow regulating unit 100 has a plate-like substantially triangular shape expanding toward the outer surface of the fixing portion 110. However, the shape of the projecting portion may be arbitrarily determined.

Modified Example 9

According to this embodiment, the pair of the projecting portions 121 and 122 and the pair of the projecting portions 123 and 124 of the projecting portions 120 of the flow regulating unit 100 extend substantially parallel with the virtual plane P. However, the projecting portions are not required to be parallel with one another but may radially extend with respect to the illumination axis L, the sealing portions 82 and 83 or the like.

Modified Example 10

According to this embodiment, the flow regulating unit 100 are disposed in an area out of the effective optical path. However, the flow regulating unit may be positioned within the effective optical path area. In this case, decrease in the amount of light emitted from the arc tube 80 can be prevented by using the flow regulating unit made of transparent quartz glass or the like capable of transmitting light from the arc tube 80 and applying anti-reflection processing to the surface of the flow regulating unit.

Modified Example 11

While the projector 1 according to this embodiment includes the lens integrator optical system containing the first lens array 12 and the second lens array 13 as the optical system for equalizing the illuminance of emitted light, a rod integrator optical system containing a light guide rod may be used.

Modified Example 12

While the projector 1 according to this embodiment is a front type projector, the invention is applicable to a rear type projector including a screen as a projection target surface in one unit.

Modified Example 13

According to the optical systems of the projector 1 in this embodiment, the liquid crystal devices 30R, 30G, 30B as the optical modulation devices are transmission type liquid crystal devices. However, reflection type optical modulation devices such as reflection type liquid crystal devices may be used.

Modified Example 14

According to the optical systems of the projector 1 in this embodiment, the liquid crystal devices 30R, 30G, 30B as the optical modulation devices are used. However, any types of optical modulation device may be employed as long as they can generally modulate entering light according to image signals. For example, micromirror type optical modulation devices may be used. The micromirror type optical modulation devices may be constituted by a DMD (digital micromirror device).

Modified Example 15

According to the optical systems of the projector 1 in this embodiment, the optical modulation devices are those of so-called three-plate type which includes the three liquid crystal devices 30R, 30G, and 30B in correspondence with the red light, green light, and blue light. However, single-plate type may be employed. Moreover, a liquid crystal device for improving contrast may be added.

The present application claims priority from Japanese Patent Application No. 2009-062407 filed on Mar. 16, 2009, which is hereby incorporated by reference in its entirety.

What is claimed is:

1. A light source device, comprising:
   an arc tube having a tube spherical portion containing a pair of electrodes disposed along an illumination axis, and a pair of sealing portions extending from both sides of the tube spherical portion;
   a reflector having a reflection portion disposed in a vicinity of one of the sealing portions of the arc tube for reflecting light emitted from the arc tube toward an illumination area;
   a flow regulating unit including:
      a plurality of projecting portions configured to regulate a flow direction of cooling air, each projecting portion of the plurality of projecting portions being configured to have a length extending along the illumination axis; and
      a fixing portion for fixing the plurality of projecting portions to one of the pair of sealing portions in a vicinity of the tube spherical portion, and an adhesive filled between the fixing portion and the one of the pair of sealing portions, wherein
      each of the plurality of projecting portions is disposed on a side of the fixing portion that is opposite to a side of the fixing portion on which the adhesive is disposed, and
      a virtual plane that passes through the illumination axis and extends along the length of the plurality of projecting portions is interposed between adjacent protecting portions of the plurality of projecting portions so that the adjacent projecting portions sandwich the virtual plane.

2. The light source device according to claim 1, wherein the virtual plane extends vertically in the direction of gravity.

3. The light source device according to claim 2, wherein the plurality of projecting portions are configured to be substantially symmetric with respect to the virtual plane.

4. The light source device according to claim 1, wherein each sealing portion is configured to be tubular, the one of the pair of sealing portions being inserted through the fixing portion.

5. The light source device according to claim 1, wherein the fixing portion is configured to have an inclined portion expanding toward the tube spherical portion along the illumination axis.

6. The light source device according to claim 1, wherein the flow regulating unit is set up in an area out of an effective optical path.

7. A projector, comprising:
   the light source device according to claim 1; and
   an optical modulation device configured to form an optical image by modulating light emitted from the light source device according to an image signal.

8. A projector, comprising:
   the light source device according to claim 2; and
   an optical modulation device configured to form an optical image by modulating light emitted from the light source device according to an image signal.

9. A projector, comprising:
   the light source device according to claim 3; and
   an optical modulation device configured to form an optical image by modulating light emitted from the light source device according to an image signal.

10. A projector, comprising:
    the light source device according to claim 4; and
    an optical modulation device configured to form an optical image by modulating light emitted from the light source device according to an image signal.

11. A projector, comprising:
    the light source device according to claim 5; and
    an optical modulation device configured to form an optical image by modulating light emitted from the light source device according to an image signal.

12. A projector, comprising:
    the light source device according to claim 6; and
    an optical modulation device configured to form an optical image by modulating light emitted from the light source device according to an image signal.

13. The light source device according to claim 1, wherein each of the projecting portions has a height extending in a direction perpendicular to the illumination axis and parallel to the virtual plane, and a width extending in a direction perpendicular to the virtual plane.

14. The light source device according to claim 1, wherein the length of each of the plurality of projecting portions is less than a length of the fixing portion extending along the illumination axis.

15. The light source device according to claim 1, wherein each of the plurality of projecting portions has a substantially triangular plate shape.

* * * * *